May 9, 1961 W. G. HODLEWSKY 2,983,158
CHAIN WITH INTIMATELY UNITED BUSHING AND SIDE PLATE, AND
METHOD OF MAKING SAME
Filed Aug. 9, 1957

INVENTOR.
WASYLY G. HODLEWSKY
BY
*Ernst W. Schultz*
ATTORNEY

United States Patent Office 2,983,158
Patented May 9, 1961

2,983,158
CHAIN WITH INTIMATELY UNITED BUSHING AND SIDE PLATE, AND METHOD OF MAKING SAME

Wasyly G. Hodlewsky, Milwaukee, Wis., assignor to Chain Belt Company, Milwaukee, Wis., a corporation of Wisconsin Filed Aug. 9, 1957, Ser. No. 677,390

6 Claims. (Cl. 74—245)

This invention relates to the manufacture of metal chain and particularly to roller chain operating over sprockets.

The type of chain referred to comprises spaced pairs of plates joined by pins extending through bushings which join other spaced pairs of plates having free rollers assembled on the bushings between the last named plates. In some cases the rollers are not required and are omitted, particularly in the smaller sizes of chains.

In the assembled chain, the pin plates may be secured on the pins by various means which take advantage of the fact that the ends of the pins are exposed for cold heading or riveting or project a sufficient distance to be fitted with cotter pins and the like. Such securement is also necessary to prevent rotation of the pin relative to the pin plate.

Securement of the bushing plate is required to prevent rotation of the bushing and to keep the plate from moving off the end of the bushing and into contact with the adjacent pin plate with contact prevents normal articulation of the chain. The bending of the pin and bushing under high loads and the imperfect dimensions of the chain parts cause sideward forces to develop under load which forces effect displacement of the plates. The ends of the bushings are under compression within the plates and are "barreled" due to the press fit so that the plate invariably moves off the bushing. Dimensional variations between the individual bushing plates of each pair, however slight or insignificant in other respects, also cause the plates and bushings to work loose.

External forces in normal chain service which tend to displace the bushing plates from the bushings may also occur as each sprocket tooth enters between the bushing plates to engage the bushing or roller and contact one or the other bushing plates in keeping the chain from running off the sprocket.

Because of space limitations and cost, the frictional securement of the bushings in the bushing plates in most cases is solely relied on to hold the plates on the bushing. The frictional securement of the bushing plate is arranged by providing the plate and bushing with an interference fit prior to their assembly. A limited amount of interference may actually set up stresses in the bushing plates favorable to fatigue life of the plates. However, the compressive forces on the bushing reduce the strength of the bushing. The bushings are also subject to plastic deformation which also limits the compressive force effecting the press fit.

An object of the invention is to increase such frictional securement without increased and possibly with less interference between the bushing and plate.

Another object is to improve the chain so that the articular parts of the chain namely, the pin and bushing, are less subject to wear and working loose in the respective plates.

In the absence of lubrication, the hardened surfaces of the pin and bushing are subject to seizure which is, of course, ruinous to the chain for the reason that wearing of the parts proceeds very rapidly thereafter, and either the pin or bushing or both may turn loose in their respective plates.

The present invention serves to prevent such difficulties and improves the bearing qualities of the articular parts of the chain in that the lubricant applied to the chain is retained longer by the bushing and seizure is avoided or prevented for longer periods of operation without lubrication.

However, lubricant applied to the chain unavoidably reaches the joint between the bushing and the plate and may enter the joint to reduce the frictional forces in effect between the plate and bushing. That is, such lubrication undesirably promotes the displacement of the bushing plates from the bushing.

The present invention provides an increased frictional securement of the plate on the bushing which offsets the effect of lubricant applied to the chain to relieve the sliding friction between the bushing and pin.

Thus, the present invention provides an improved chain having greater serviceability both as to the securement of the bushing plate resisting displacement on the bushing and as to the lubrication of the wearing parts of the chain.

In carrying out the present invention, the bushing which is disposed intermediate the bushing plate and the pin is altered so that the frictional securement of the bushing in the bushing plate is "increased" while at the same time the friction between the bushing and the pin is, in effect, "reduced." Similarly, the effectiveness of the lubricant applied to the bushing is increased insofar as the pin is concerned and is reduced insofar as the plate is concerned.

In practically all such chain, the pins and bushings, being subject to wear, have at least a case hardness to provide maximum resistance to such wear while the tension elements, being subject to cyclic tension loads of extremely high number, must be relatively less hard in order to have the necessary toughness and resistance to fatigue.

The present invention is directed to such chain and contemplates the alteration of the surfaces of the bushings by etching to provide an outer surface or film having a mechanical stability corresponding generally to or reduced to approach that of the bushing plate. The altered surface results in an improved mechanical fit between the bushing and plate and in an improved bearing between the bushing and pin. The etching process may be carried out with either an acid or an alkaline solution in concentrations which may be readily determined by test, as described hereinafter.

The drawings furnished herewith illustrate the best mode of carrying out the invention as presently contemplated as set forth hereinafter.

Figure 1:
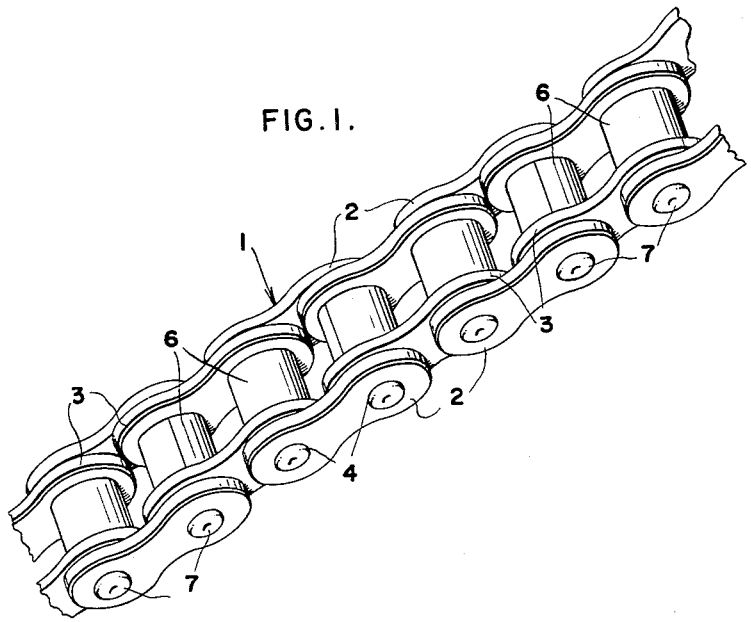
Figure 1 is a perspective view of a short length of single strand roller chain.
Figure 2:
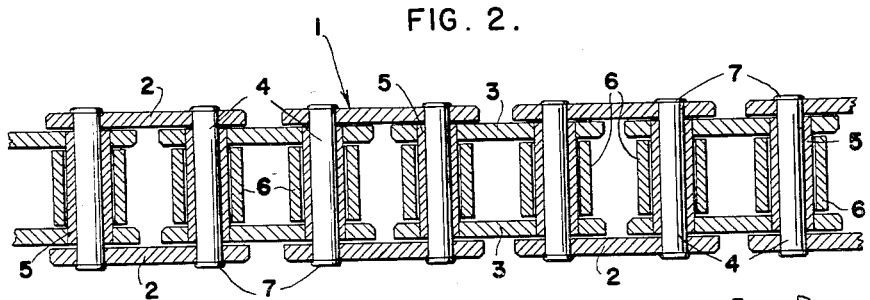
Fig. 2 is a longitudinal transverse section taken through the chain in a plane coinciding with the pitch line of the chain.
Figure 3:
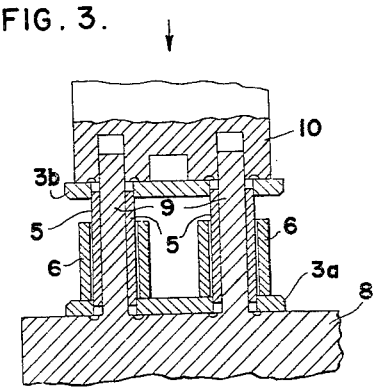
Figure 4:
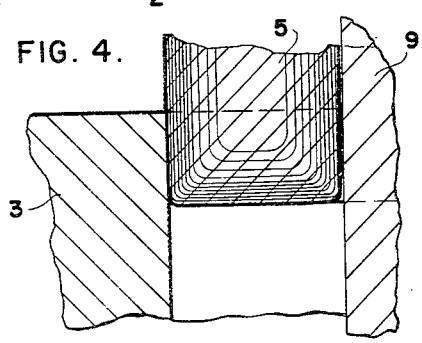

Fig. 3 is a diagrammatic view illustrating the tool with which the bushing may be pressed into the hole of the bushing plate; and Fig. 4 is an enlarged cross-section of a corner of the bushing entering the hole of a plate to show the portions of the bushing and plate subject to removal in effecting the press fit and with the case hardness of the bushing shown with a series of lines over the section.

The chain 1 shown in the drawings comprises the pairs of pin plates 2 and bushing plates 3 which are respectively joined by the solid pins 4 and the bushings 5 through which pins 4 extend. The rollers 6 are loosely mounted on the respective bushings 5 between the bushing plates 3.

Pins 4 and bushings 5 form the articular parts of the chain. The pins 4 are subject to bending and are of a carbon steel alloy capable of supporting the loads imposed at the ends of the pins by the respective plates 2. The pins rotate within bushings 5 and to prevent undue wearing, are hardened so that a hard surface is provided without making the entire pin brittle and subject to breakage. Pins 4 which are to turn only in the bushings are press-fit in the holes of pin plates 2 to prevent turning of the pins in the pin plates and are formed at their ends as at 7 as the last operation in the assembly of the chain to hold the pin plate 2 on the pins.

Bushings 5 are generally formed of pieces of flat metal which are individually cut to the desired length and curled to cylindrical form. Being subject to wear by the pin rotating therein and by the rollers 6 assembled thereon between plates 3, bushings 5 are hardened for resistance to wear.

In normal chain manufacture both bushings are assembled in a single operation with rollers 6 between a pair of bushing plates as shown in Fig. 3 wherein the lower bushing plate 3a is first placed on block 8 with the guides 9 extending upwardly through the holes of the plate and the bushings 5 placed on guides 9 to enter the holes. The rollers 6 are placed over the respective bushings 5 to rest on plate 3a and upper plate 3b is then set on the upper ends of the bushings to be forced downwardly by the mandrel 10. Suitable abutment means, not shown, are carried by both block 8 and mandrel 10 for locating plates 3a and 3b with respect to bushings 5 on guides 9.

In press-fitting each bushing into the hole of the respective plate, portions of the film of both parts are displaced, providing uncontaminated surfaces which are subject to contact by similar uncontaminated surfaces of the other part. With a given degree of pressure as determined by the press-fit, the mechanical or frictional securement of the bushing and the plate is increased in proportion to the increase in the areas of such contact.

According to the present invention, bushings 5, before press-fitting into the holes of plates 3, are immersed in a mild etchant for the short period of time necessary only to reduce the mechanical stability of the surface film of the metals. Inasmuch as chain service requires that the bushing be hardened for resistance to wear and the plate relatively tempered for toughness and resistance to fatigue, such etching effects a mechanical weakening of the bushing surface so that its resistance to mechanical displacement more nearly corresponds with that of the surface of the plate. That is, the considerable differences in the surface structure of the bushing and plate are reduced by etching the harder of the two parts. Where the plates have also been blued as in a conventional bath, such differences are slightly greater and the effect of etching the bushing is slightly more pronounced. In either case, upon pressing the etched bushings into the holes of the respective plates, a larger percentage of the film of the bushing is displaced and a greater area of the assembled parts is in intimate metal-to-metal contact, referring by comparison to the percentage of the film of an unetched bushing which is displaced in a similar assembly.

The etching process affords a greatly improved mechanical securement offering far more resistance to displacement of the bushing plate and prevents the development of tight joints in the chain.

A typical chain of the type referred to and similar to that described above has a pitch of ⅜ inch, a width of 0.41 inch and comprises bushing plates which are blanked and beveled from 1050 carbon steel strip stock of 0.050 inch thickness. The bushing holes are formed and then burnished by forcing over-sized hardened steel balls through the holes. The over-size of the balls may be up to 0.004 inch to provide finished holes of 0.197 inch diameter. The plates are then tumbled, cleaned, heat treated to a hardness of $R_c$ 55 and tempered to $R_c$ 42–45 for toughness and resistance to fatigue. After recleaning, the plates are blued in a nitride bath of 600° F. which gives the plates an improved appearance and protection against rusting.

The bushings are blanked from 0.20% carbon steel flat stock of 0.034 inch thickness to have a length of 0.292 inch and curled to a diameter of 0.200 inch. After curling, the bushings are carburized and then quenched in oil or water to provide a case hardness of $R_c$60 plus to a depth of 0.006 inch.

The interference fit of 0.003 inch between the usual unetched bushing and plates was found by a series of tests to support an average push-off load of 225 pounds. In each such test, a single bushing and assembled plate was mounted in a press and a force was applied against the end of the bushing in the hole of the plate acting parallel to the bushing axis.

The same tests were also made with plates and bushings which latter had been etched prior to press-fitting into the bushing holes of the plates. In such tests the average push-off load was 650 pounds.

The etched bushings include different groups of bushings etched in nitric acid dissolved in water and in alcohol and sodium hydroxide dissolved in water and for different periods as follows:

| Bath | Percent Concentration by Weight | Etching Time (minutes) | Push-Off Load (pounds) |
|---|---|---|---|
| Nitric Acid in Water at 70° F | 0.5 | 5 | 750 |
|  | 1.0 | 5 | 750 |
|  | 2.0 | 5 | 650 |
|  | 4.0 | 3 | 650 |
|  | 6.0 | 3 | 650 |
|  | 9.0 | 3 | 600 |
| Nitric Acid in Alcohol at 70° F | 1.0 | 5 | 800 |
|  | 2.0 | 5 | 750 |
|  | 4.0 | 5 | 700 |
|  | 8.0 | 3 | 750 |
| Sodium Hydroxide in Water at 250–280° F. | [1] 50 | 4 | 525 |
|  | [1] 50 | 8 | 575 |
|  | [1] 50 | 12 | 675 |
|  | [1] 50 | 20 | 725 |

[1] Includes 16% sodium and potassium nitrates.

Demonstrating the advantages in etching the bushings, a number of such chains were made of two sections each. The first sections comprised unetched bushings and the second sections comprised bushings etched as described above. These chains were then run over sprockets at high speeds and under considerable loads for various periods until the chains had developed at least several tight joints wherein the bushing plates were in tight contact with the pin plates. These tight joints occurred only in the first sections of chain. The second sections of the chains were, in every case, still serviceable and freely articulating.

Examination of these chains showed an undisturbed mechanical fit between the plates and the etched bushings of the second sections of these chains. Examination of these chains also showed that the etched bushings were less worn by reason of the better lubrication between the hardened surfaces of the pin and the etched surface of the bushing.

The etching importantly does not affect the case hardening of the bushing or resistance of the bushing to crushing by the sprocket teeth.

The intimate metal-to-metal contact effected between the bushing and the bushing plate under pressure as described above and claimed hereinafter may be considered a form of cold welding of the two parts.

Various modes of carrying out the invention are contemplated as being within the scope of the following claims particularly pointing out and distinctly claiming the subject matter which is regarded as the invention.

I claim:
1. In the assembly of a chain having metal bushings hardened for resistance to wear and corresponding bushing plates relatively tempered for toughness and resistance to fatigue, the method of securing each bushing within the hole of the corresponding bushing plate which method comprises providing a plate having a hole therein, providing a bushing having an outer diameter slightly greater than the diameter of said hole, etching the surface of the bushing and thereby reducing the mechanical stability of the bushing surface to approximate that of the bushing plate surface, and pressing the end of the bushing into the hole of the plate thereby effecting removal of corresponding portions of the films of both said parts to place such parts in intimate metal-to-metal contact under pressure providing maximum resistance to forces encountered in chain service which tend to effect displacement of the plate from the bushing.

2. In the manufacture of chain having bushings hardened for resistance to wear and plates relatively tempered for toughness and resistance to fatigue and having holes which are dimensioned to receive the respective ends of the bushings with a press fit, the improvement which comprises etching the bushings and thereby reducing the mechanical stability only of the outer film of the bushings to correspond generally to that of the plates and thereafter pressing the ends of the bushings into the respective holes of the plates and in doing so effecting removal of the film of the hardened bushing to place a substantial area of the two parts in intimate metal-to-metal contact having a maximum co-efficient of friction and providing maximum resistance to forces encountered in chain service tending to effect displacement of the plates from the respective ends of the bushings.

3. In the manufacture of chain having pins and bushings hardened for resistance to wear and tension elements relatively tempered for toughness and resistance to fatigue and provided with holes which are dimensioned to receive the respective pins and bushings with an interference fit, the improvement which comprises reducing the mechanical stability only of the entire outer film of the bushings to correspond generally to that of the respective tension elements pressing the end of each bushing into the hole of the respective tension element and effecting the removal of interfering portions of both parts for their intimate metal-to-metal contact with a maximum co-efficient of friction to provide maximum resistance to forces encountered in chain service tending to effect displacement of the tension elements from the respective bushings, and thereafter applying lubricant to the chain and utilizing the etched surface of the bushing to retain the lubricant.

4. In a chain having tension elements comprising pin plates and bushing plates and articular parts joining said tension elements, said parts comprising hollow, cylindrical bushings having opposite ends press fitted in corresponding holes in said bushing plates and pins extending through corresponding bushings and having opposite ends fitted in corresponding holes in said pin plates, said pins and bushings being hardened for resistance to wear and said tension elements being relatively tempered for resistance to fatigue, said chain being characterized by the improvement in the securement of the ends of the bushings in the bushing plates wherein each bushing is etched prior to assembly of the bushings in the bushing plates with a press-fit, and said press fit effecting removal of corresponding portions of the surfaces of said bushing and bushing plates to place the areas exposed by the removal of said portions in intimate metal-to-metal contact under pressure whereby their frictional securement is more resistive to forces tending to effect their relative displacement and wherein the surfaces of the bushings are lubricated after such assembly, said lubrication being ineffective insofar as said desired securement is concerned and more effective insofar as the sliding friction between the pin and bushing is concerned by reason of the retention of the lubricant by the etched surfaces of the bushing.

5. In a chain having tension elements comprising pin plates and bushing plates and articular parts joining said tension elements, said parts comprising hollow, cylindrical bushings having opposite ends press fitted in corresponding holes in said bushing plates and pins extending through corresponding bushings and having opposite ends fitted in corresponding holes in said pin plates, said pins and bushings being hardened for resistance to wear and said tension elements being relatively tempered for resistance to fatigue, said bushings having etched surfaces of a mechanical stability considerably less than that of the bearing surfaces of the pins and approaching that of the bushing plates, said chain being characterized by the improvement in the securement of the ends of the bushings in the bushing plates wherein at least the outer circumferences of said opposite ends of each bushing are etched prior to assembly of the bushings in the bushing plates with a press-fit, said press fit effecting removal of corresponding portions of the surfaces of said bushing and bushing plates to place the areas exposed by the removal of said portions in intimate metal-to-metal contact under pressure whereby their frictional securement is more resistive to forces tending to effect their relative displacement.

6. In the assembly of a chain having a bushing of cylindrical form and a plate provided with a hole dimensioned to receive one end of said bushing with an interference fit, the method of obtaining maximum frictional securement of said end of the bushing in the plate which comprises hardening the bushing to prevent loss of interference pressure due to plastic deformation of the bushing and for resistance to wear in chain service, thereafter reducing the mechanical stability of the outer film only of the hardened case by etching the bushing, and then pressing the end of the bushing into the hole of the plate.

References Cited in the file of this patent

UNITED STATES PATENTS

| | | |
|---|---|---|
| 1,714,708 | Winning | May 28, 1929 |
| 2,433,457 | Jarrett et al. | Dec. 30, 1947 |
| 2,491,677 | McCulloch | Dec. 20, 1949 |
| 2,773,971 | Teerlink | Dec. 11, 1956 |

OTHER REFERENCES

Shot Peening, published in 1947 by American Wheelabrator and Equipment Corp., Mishawaka, Wisconsin.
The Modern Industrial Press, May 1949.